US005703181A

United States Patent [19]
Tashiro et al.

[11] Patent Number: 5,703,181
[45] Date of Patent: Dec. 30, 1997

[54] CATALYST OLEFIN POLYMERIZATION AND PROCESS FOR OLEFIN POLYMERIZATION USING THE SAME

[75] Inventors: Takashi Tashiro; Takashi Ueda, both of Waki-cho, Japan

[73] Assignee: Mitsui Petrochemical Industries, Ltd., Tokyo, Japan

[21] Appl. No.: 585,812

[22] Filed: Jan. 16, 1996

Related U.S. Application Data

[63] Continuation of Ser. No. 153,371, Nov. 16, 1993, abandoned.

[30] Foreign Application Priority Data

Nov. 18, 1992 [JP] Japan ................... 4-309087
Dec. 3, 1992 [JP] Japan ................... 4-324510

[51] Int. Cl.$^6$ ............... C08F 4/649; C08F 4/648; C08F 10/00
[52] U.S. Cl. ............... 526/140; 502/122; 502/123; 502/125; 502/126; 502/127; 526/114; 526/124.1; 526/124.8; 526/124.9; 526/141; 526/142; 526/143; 526/160
[58] Field of Search ............... 502/122, 117; 526/140

[56] References Cited

U.S. PATENT DOCUMENTS

| | | | |
|---|---|---|---|
| 2,987,511 | 6/1961 | Arrigo | 526/114 |
| 3,161,628 | 12/1964 | Dost et al. | 526/140 |
| 3,271,381 | 9/1966 | Andersen et al. | 526/140 |
| 3,595,849 | 7/1971 | Nokano et al. | 526/140 |
| 3,678,025 | 7/1972 | Birrell | 526/114 |
| 5,032,562 | 7/1991 | Lo et al. | |
| 5,241,025 | 8/1993 | Hlotky et al. | 526/132 |

FOREIGN PATENT DOCUMENTS

| | | | |
|---|---|---|---|
| 220436 | 2/1959 | Australia | 526/160 |
| 2027145 | 4/1991 | Canada . | |
| 2033416 | 6/1991 | Canada . | |
| 0374619 | 6/1990 | European Pat. Off. . | |
| 0416928 | 3/1991 | European Pat. Off. . | |
| 427697 | 5/1991 | European Pat. Off. . | |
| 0427697 | 5/1991 | European Pat. Off. . | |
| 0436328 | 7/1991 | European Pat. Off. . | |
| 0439964 | 8/1991 | European Pat. Off. . | |
| 500944 | 2/1992 | European Pat. Off. | 526/160 |
| 0478913 | 4/1992 | European Pat. Off. . | |
| 511665 | 11/1992 | European Pat. Off. . | |
| 0511665 | 11/1992 | European Pat. Off. . | |
| 959499 | 6/1964 | United Kingdom | 526/142 |

*Primary Examiner*—Edward J. Smith
*Attorney, Agent, or Firm*—Sherman and Shalloway

[57] ABSTRACT

Disclosed are a catalyst for olefin polymerization comprising (A) a compound of a transition metal in Group IVB of the periodic table which contains a ligand having a cyclopentadienyl skeleton, (B) an organoaluminum compound and any one of (C1) a Brønsted acid; (C2) a material obtained by contacting (c-1) a magnesium compound with (c-2) an electron donor; and (C3) a material obtained by contacting (c-1) a magnesium compound, (c-2) an electron donor and (c-3) an organometallic compound with each other. Also disclosed are processes for polymerizing an olefin in the presence of the above-mentioned catalysts for olefin polymerization. Such catalysts and processes for olefin polymerization as described above are excellent in olefin polymerization activity and economical efficiency.

3 Claims, 2 Drawing Sheets

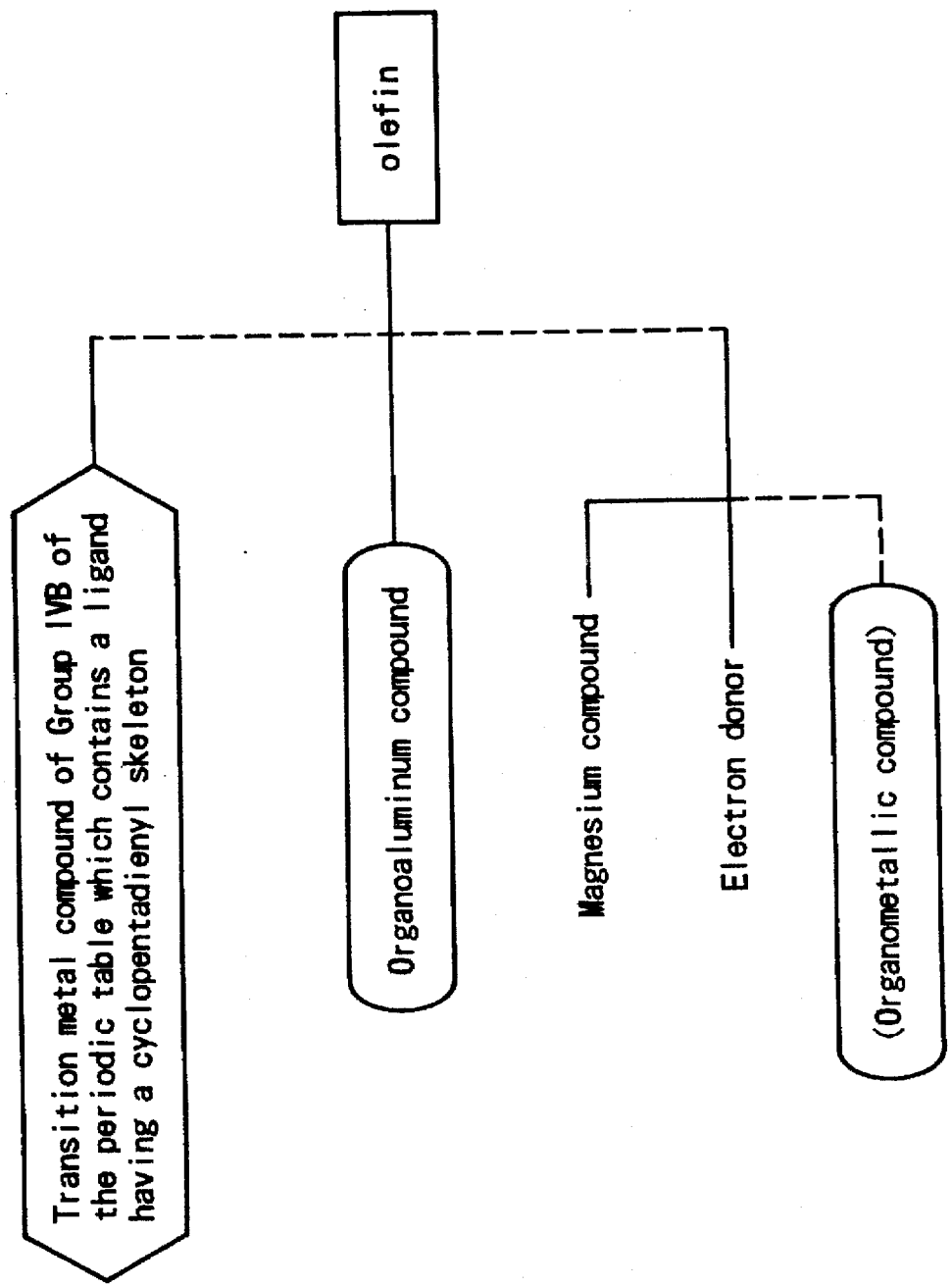

CATALYST OLEFIN POLYMERIZATION AND PROCESS FOR OLEFIN POLYMERIZATION USING THE SAME

This application is a continuation of application Ser. No. 08/153,371, filed Nov. 16, 1993, abandoned.

FIELD OF THE INVENTION

The present invention relates to a catalyst for olefin polymerization and a process for olefin polymerization. More particularly, the invention relates to a Ziegler catalyst for olefin polymerization which contains no organoaluminum oxy-compound and to a process for olefin polymerization using the catalyst.

BACKGROUND OF THE INVENTION

Known in the prior art is a titanium-type catalyst comprising a titanium compound and an organoaluminum compound or a vanadium-type catalyst comprising a vanadium compound and an organoaluminum compound, for use in the production of an olefin (co)polymer including an ethylene homopolymer and ethylene/α-olefin copolymers.

Further, a Ziegler catalyst for olefin polymerization comprising a zirconium compound and an organoaluminum oxy-compound (aluminoxane) is also known as a catalyst which can be used for producing an olefin (co)polymer with a high polymerization activity, and a process for preparing an ethylene/α-olefin copolymer using such catalyst is proposed in, for example, Japanese Patent Laid-Open Publications No. 19309/1983, No. 35005/1985, No. 35006/1985, No. 35007/1985 and No. 35008/1985. Moreover, a process for polymerizing an olefin using a catalyst formed from a mixture of a zirconium compound and an organoaluminum compound consisting of aluminoxane and an organoaluminum compound is proposed in Japanese Patent Laid-Open Publications No. 260602/1985 and No. 130604/1985.

In the presence of such a catalyst comprising the zirconium compound and the organoaluminum oxy-compound, olefins can be polymerized with a high polymerization activity. However, there is such a problem in the case of using the organoaluminum oxy-compound that, since the compound is generally prepared by causing an organoaluminum compound to react with water and this reaction process is complicated, the compound becomes expensive and, therefore, the cost for preparing an olefin (co)polymer also becomes high.

On that account, eagerly desired now is the advent of a catalyst for olefin polymerization which comprises a zirconium compound and an organometallic compound other than the organoaluminum oxy-compound and which is excellent not only in the olefin polymerization activity but also in the economical efficiency. Further, the advent of a process for polymerizing an olefin using such a catalyst is also desired.

As such a catalyst for olefin polymerization, for reference, a catalyst comprising a transition metal compound, a Lewis acid and an organoaluminum compound is proposed in Japanese Patent Laid-Open Publication No. 179005/1991.

OBJECT OF THE INVENTION

The present invention has been accomplished to solve the above problems in the prior art and it is, therefore, an object of the present invention to provide a catalyst for olefin polymerization which is excellent in both the olefin polymerization activity and the economical efficiency and to provide a process for polymerizing an olefin using this catalyst.

SUMMARY OF THE INVENTION

The first catalyst for olefin polymerization according to the present invention comprises:

(A) a compound of a transition metal in Group IVB of the periodic table, which contains a ligand having a cyclopentadienyl skeleton;

(B) an organoaluminum compound; and (C1) a Brønsted acid.

The Brønsted acid (C1) preferably is a solid acid or an organic acid. The solid acid preferably is an ion-exchange material or a heteropolyacid, and the organic acid preferably is a sulfonic acid.

The second catalyst for olefin polymerization according to the present invention comprises:

(A) a compound of a transition metal in Group IVB of the periodic table, which contains a ligand having a cyclopentadienyl skeleton;

(B) an organoaluminum compound; and (C2) a material obtained by contacting
  (c-1) a magnesium compound, with
  (c-2) an electron donor.

The third catalyst for olefin polymerization according to the present invention is a catalyst for olefin polymerization comprises:

(A) a compound of a transition metal in Group IVB of the periodic table, which contains a ligand having a cyclopentadienyl skeleton;

(B) an organoaluminum compound; and (C3) a material obtained by contacting with each other
  (c-1) a magnesium compound,
  (c-2) an electron donor, and
  (c-3) an organometallic compound.

The process for olefin polymerization according to the present invention comprises polymerizing an olefin in the presence of the above-mentioned catalysts for olefin polymerization.

The catalyst for olefin polymerization and the process for olefin polymerization according to the invention are excellent in both the olefin polymerization activity and the economical efficiency.

BRIEF DESCRIPTION OF THE DRAWING

FIG. 2 is an explanatory view of another process for preparing a catalyst for olefin polymerization according to the present invention.

DETAILED DESCRIPTION OF THE INVENTION

Figure 1:
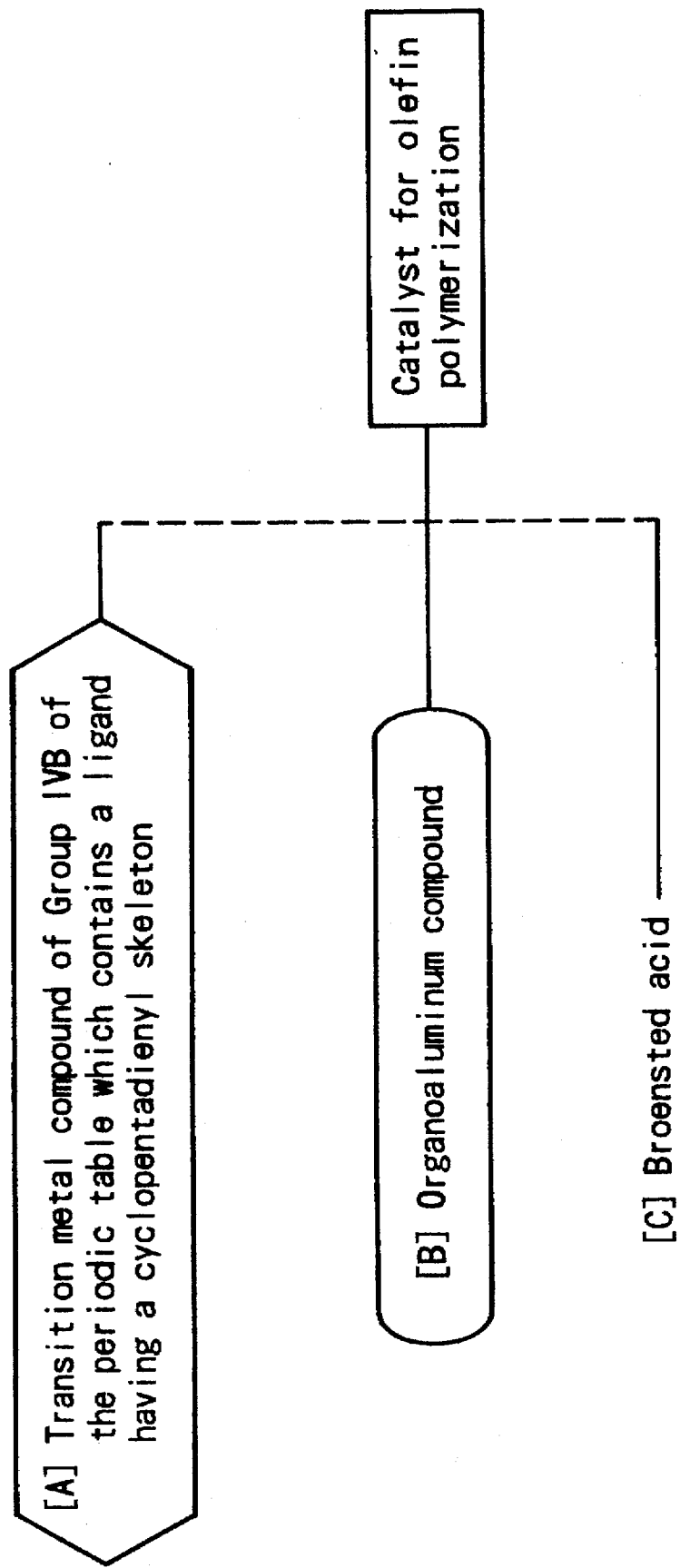
FIG. 1 is an explanatory view of a process for preparing a catalyst for olefin polymerization according to the present invention.

The catalyst for olefin polymerization and the process for olefin polymerization according to the present invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

Each of FIGS. 1 and 2 shows steps of a process for preparing the catalyst for olefin polymerization according to the present invention.

The first catalyst for olefin polymerization according to the present invention comprises:

(A) a compound of a transition metal in Group IVB of the periodic table, which contains a ligand having a cyclopentadienyl skeleton;

(B) an organoaluminum compound; and (C1) a Brønsted acid.

The compound (A) of a transition metal in Group IVB of the periodic table which contains a ligand having a cyclopentadienyl skeleton (hereinafter sometimes referred to as "component (A)") can be a compound represented by following formula (I):

$$ML_x \quad (I)$$

wherein M is a transition metal selected from metals of Group IVB of the periodic table; L is a ligand coordinating to the transition metal; at least one of L is a ligand having a cyclopentadienyl skeleton; L other than the ligand having a cyclopentadienyl skeleton is a hydrocarbon group of 1 to 12 carbon atoms, an alkoxy group, an aryloxy group, a trialkylsilyl group, $SO_3R$ (wherein R is a hydrocarbon group of 1 to 8 carbon atoms which may have a substituent group such as halogen), a halogen atom or hydrogen atom; and x is a valence of the transition metal.

In the above formula (I), M is concretely zirconium, titanium or hafnium, and it is preferably zirconium.

Examples of the ligand having a cyclopentadienyl skeleton include a cyclopentadienyl group; an alkyl-substituted cyclopentadienyl group, such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group and a hexylcyclopentadienyl group; an indenyl group; a 4,5,6,7-tetrahydroindenyl group; and a fluorenyl group. These groups may be substituted with a halogen atom, a trialkylsilyl group, etc.

Of these ligands coordinating to the transition metal, particularly preferred is an alkyl-substituted cyclopentadienyl group.

When the compound represented by the formula (I) contains at least two groups each having a cyclopentadienyl skeleton, any optional two of them may be bonded to each other through an alkylene group such as ethylene and propylene, a substituted alkylene group such as isopropylidene and diphenylmethylene, a silylene group, or a substituted silylene group such as dimethylsilylene, diphenylsilylene and methylphenylsilylene.

Examples of the ligand L other than those having a cyclopentadienyl skeleton are as follows.

The hydrocarbon group having 1 to 12 carbon atoms includes, for example, an alkyl group, a cycloalkyl group, an aryl group and an aralkyl group.

Concrete examples of the alkyl group include methyl, ethyl, propyl, isopropyl and butyl.

Concrete examples of the cycloalkyl group include cyclopentyl and cyclohexyl. Concrete examples of the aryl group include phenyl and tolyl.

Concrete examples of the aralkyl group include benzyl and neophyl.

The alkoxy group includes, for example, methoxy, ethoxy and butoxy.

The aryloxy group includes, for example, phenoxy.

The halogen includes, for example, fluorine, chlorine, bromine and iodine.

The ligand represented by $SO_3R$ includes, for example, a p-toluenesulfonate group, a methanesulfonate group and a trifluoromethanesulfonate group.

In case that, for example, the trasition metal has a valence of 4, the transition metal compound (A) containing a ligand having a cyclopentadienyl group is represented more concretely by the following formula (I'):

$$R^1_a R^2_b R^3_c R^4_d M \quad (I')$$

wherein M is the same transition metal as that in the formula (I); $R^1$ is a group (ligand) having a cyclopentadienyl skeleton; $R^2$, $R^3$ and $R^4$ are each a group (ligand) having a cyclopentadienyl skeleton, an alkyl group, a cycloalkyl group, an aryl group, an aralkyl group, an alkoxy group, an aryloxy group, a trialkylsilyl group, $SO_3R$, a halogen atom or hydrogen atom; a is an integer of not less than 1; and a+b+c+d=4.

In the invention, preferably used as the transition metal compound is a metallocene compound represented by the above formula (I') wherein at least two of $R^1$, $R^2$, $R^3$ and $R^4$, for example, $R^1$ and $R^2$, are groups (ligands) each having a cyclopentadienyl skeleton.

The at least two groups (for example, $R^1$ and $R^2$) each having a cyclopentadienyl skeleton may be bonded to each other through an alkylene group such as ethylene and propylene, a substituted alkylene group such as isopropylidene and diphenylmethylene, a silylene group, or a substituted silylene group such as dimethylsilylene, diphenylsilylene and methylphenylsilylene.

The other groups (for example, $R^3$ and $R^4$) are each a group having a cyclopentadienyl group, an alkyl group, a cycloalkyl group, an aryl group, an aralkyl group, an alkoxy group, an aryloxy group, a trialkylsilyl group, $SO_3R$, a halogen atom or hydrogen atom.

Listed below are concrete examples of the transition metal compound containing zirconium as M.

Bis(indenyl)zirconium dichloride,
Bis(indenyl)zirconium dibromide,
Bis(indenyl)zirconiumbis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconiumbis(methanesulfonate),
Ethylenebis(indenyl)zirconiumbis(p-toluenesulfonate),
Ethylenebis(indenyl)zirconiumbis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconiumbis(trifluromethanesulfonate),
Dimethylsilylenebis(4,5,6,7-tetrahydroindenyl)zirconium dichloride,
Dimethylsilylene(cyclopentadienyl-fluorenyl)zirconium dichloride, Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconiumbis(methanesulfonate),
Bis(cyclopentadienyl)zirconiumbis(p-toluenesulfonate),
Bis(cyclopentadienyl)zirconiumbis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconiumbis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconiumbis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the above-listed examples, the di-substituted cyclopentadienyl ring includes 1,2- and 1,3-substituted rings and the tri-substituted cyclopentadienyl ring includes 1,2,3- and 1,2,4-substituted rings. The alkyl group such as propyl and butyl includes isomers thereof such as n-, i-, sec- and tert-alkyl groups.

In the present invention, compounds in which titanium or hafnium is substituted for zirconium in the above-exemplified zirconium compounds may be used as the transition metal compound (A).

The above-mentioned compounds may be used alone or in combination. Before use, they may be diluted with a hydrocarbon or a halogenated hydrocarbon.

In the present invention, preferably used as the transition metal compound (A) is a zirconocene compound having zirconium as the central metal atom and containing at least two ligands each having a cyclopentadienyl skeleton.

In the present invention, employable as the organoaluminum compound (B) (hereinafter sometimes referred to as "component (B)") is an organoaluminum compound represented by the following formula (II).

$$R^a{}_nAlX_{3-n} \qquad (II)$$

wherein $R^a$ is a hydrocarbon group of 1 to 12 carbon atoms, X is a halogen atom or hydrogen atom, and n is 1 to 3.

The hydrocarbon group of 1 to 12 carbon atoms includes, for example, an alkyl group, a cycloalkyl group and an aryl group. Concrete examples of such groups include methyl, ethyl, n-propyl, isopropyl, isobutyl, pentyl, hexyl, octyl, cyclopentyl, cyclohexyl, phenyl and tolyl group. Concrete examples of such organoaluminum compound include following compounds:

trialkylaluminums such as trimethylaluminum, triethylaluminum, triisopropylaluminum, triisobutylaluminum, trioctylaluminum and tri-2-ethylhexylaluminum;

alkenylaluminums such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalide such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Also employable as the organoaluminum compound (B) is a compound represented by the following formula (II'):

$$R^a{}_nAlY_{3-n} \qquad (II')$$

wherein $R^a$ is the same as $R^a$ in the formula (II); n is 1 or 2; and Y is $-OR^b$, $-OSiR^c{}_3$, $-OAlR^d{}_2$, $-NR^e{}_2$, $-SiR^f{}_3$ or $-N(R^g)AlR^h{}_2$ group.

$R^b$, $R^c$, $R^d$ and $R^h$ are each an alkyl group such as methyl, ethyl, isopropyl, isobutyl, cyclohexyl and phenyl groups; $R^e$ is hydrogen or a group such as methyl, ethyl, isopropyl, phenyl and trimethylsilyl groups; and $R^f$ and $R^g$ are each an alkyl group such as methyl and ethyl groups.

Concrete examples of such organoaluminum compounds include:

(i) compounds of the formula $R^a{}_nAl(OR^b)_{3-n}$ such as dimethylaluminum methoxide, diethylaluminum ethoxide and diisobutylaluminum methoxide;

(ii) compounds of the formula $R^a{}_nAl(OSiR^c{}_3)_{3-n}$ such as $Et_2Al(OSiMe_3)$, $(iso-Bu)_2Al(OSiMe_3)$ and $(iso-Bu)_2Al(OSiEt_3)$;

(iii) compounds of the formula $R^a{}_nAl(OAlR^d{}_2)_{3-n}$ such as $Et_2AlOAlEt_2$ and $(iso-Bu)_2AlOAl(iso-Bu)_2$;

(iv) compounds of the formula $R^a{}_nAl(NR^e{}_2)_{3-n}$ such as $Me_2AlNEt_2$, $Et_2AlNHMe$, $Me_2AlNHEt$, $Et_2AlN(Me_3Si)_2$ and $(iso-Bu)_2AlN(Me_3Si)_2$;

(v) compounds of the formula $R^a{}_nAl(SiR^f{}_3)_{3-n}$ such as $(iso-Bu)_2AlSiMe_3$; and (vi) compounds of the formula $R^a{}_nAl[N(R^g)-AlR^h{}_2]_{3-n}$ such as $Et_2AlN(Me)-AlEt_2$ and $(iso-Bu)_2AlN(Et)Al(iso-Bu)_2$.

Further, also employable as the organoaluminum compound (B) is an alkyl complex compound composed of a metal of Group I of the periodic table and aluminum, which is represented by the following formula:

$$M^1AlR^j{}_4$$

wherein $M^1$ is an alkaline metal such as Li, Na and K, and $R^j$ is a hydrocarbon group of 1 to 15 carbon atoms.

Concrete examples of the alkyl complex compound include $LiAl(C_2H_5)_4$ and $LiAl(C_7H_{15})_4$.

Of the organoaluminum compounds as exemplified above, preferably used are trialkylaluminum, dialkylaluminum halide, dialkylaluminum hydride and dialkylaluminum alkoxide.

The organoaluminum compounds may be used alone or in combination.

The Brønsted acid (C1) (hereinafter sometimes referred to as "component (C1)") used in the present invention includes a solid acid and an organic acid.

The solid acid includes an ion-exchange material and a heteropolyacid. Concrete examples of the ion-exchange material include an ion-exchange resin, a cellulose ion exchanger and an inorganic ion exchanger.

The ion-exchange resins include a cation-exchange resin and an anion-exchange resin. In the present invention, the cation-exchange resin, particularly a polystyrene type strongly acidic cation-exchange resin, is preferably used.

Concrete examples of such polystyrene type cation-exchange resin include a polystyrene type strongly acidic cation-exchange resin such as Amberlyst 15 and Amberlyst 16 (both: trade name) and an ultra-strongly acidic cation-exchange resin such as Nafion-H (trade name).

As the solid acid, commercially available ones may be per se used, but they may be pulverized before use because the particle diameter of the solid acid preferably is as small as possible. The particle diameter of the solid acid is preferably not more than 5 mm, more preferably not more than 2 mm.

Examples of the heteropolyacid including heteropolyacid salts, such as include metallic salts or ammonium salts of molybdophosphoric acid, molybdotungstic acid, tungstophosphoric acid, molybdosilicic acid and tungstosilicic acid. Examples of metals for forming the metallic salts include potassium, rubidium, cesium and thallium. Of these, cesium is particularly preferred.

Concrete examples of such compounds include cesium 12-molybdophosphate, potassium 12-molybdophosphate, rubidium 12-molybdophosphate, thallium 12-molybdophosphate and ammonium 12-molybdophosphate.

The organic acid includes carboxylic acids, phenols, sulfonic acids, etc. Sulfonic acids are most preferred. Concrete examples of the sulfonic acids include methanesulfonic acid, ethanesulfonic acid, trifluoromethylsulfonic acid, toluenesulfonic acid, p-toluenesulfonic acid, benzenesulfonic acid and camphor-10-sulfonic acid. Of these, methanesulfonic acid is particularly preferred.

The first catalyst for olefin polymerization according to the present invention is formed by contacting the transition metal compound (A), the organoaluminum compound (B) and the Brønsted acid (C1) with each other.

The contact of these catalyst components (A), (B) and (C1) may be carried out in an optional order, but it is preferred that the organoaluminum compound (B) is first fed to the polymerization system, and the transition metal compound (A) and the Brønsted acid (C1) are then fed to the polymerization system to contact these three components with each other.

It is also possible that the Brønsted acid (C1) and the organoaluminum compound (B) are first mixed to contact them with each other, followed by contacting with the transition metal compound (A).

When the ion-exchange material is used as the Brønsted acid (C1), the ion-exchange material may be washed with the organoaluminum compound or the like prior to the contact.

The temperature for contacting the components (A), (B) and (C1) is in the range of generally −50° to 200° C., preferably −20° to 150° C., and the period of time therefor is in the range of generally 1 to 3,000 minutes, preferably 5 to 1,200 minutes.

Next, the second catalyst for olefin polymerization according to the present invention will be described below.

The second catalyst for olefin polymerization according to the present invention comprises:

(A) a compound of a transition metal in Group IVB of the periodic table, which contains a ligand having a cyclopentadienyl skeleton;

(B) an organoaluminum compound; and (C2) a material obtained by contacting
 (c-1) a magnesium compound, with
 (c-2) an electron donor.

As the compound (A) of a transition metal in Group IVB of the periodic table, which contains a ligand having a cyclopentadienyl skeleton, there can be exemplified those used for the aforesaid first catalyst for olefin polymerization.

Also as the organoaluminum compound (B), there can be exemplified those used for the aforesaid first catalyst for olefin polymerization.

The catalyst component (C2) employable in the present invention is a material obtained by contacting a magnesium compound (c-1) with an electron donor (c-2) both described below.

The magnesium compound (c-1) includes a magnesium compound having reduction ability and a magnesium compound having no reduction ability.

The magnesium compound having reduction ability is, for example, an organomagnesium compound represented by the following formula:

$$X_n MgR_{2-n}$$

wherein R is hydrogen atom, an alkyl group of 1 to 20 carbon atoms, an aryl group or a cycloalkyl group; X is halogen atom; n is a number satisfying the relationship of 0<n<2; and when n is 0, two of R may be the same as or different from each other.

Concrete examples of the organomagnesium compound having reduction ability include:

dialkylmagnesium compounds such as dimethyimagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides such as ethylmagnesium chloride, propylmagnesium chloride, butylmagnesium chloride, hexylmagnesium chloride and amylmagnesium chloride; alkylmagnesium alkoxides such as butylethoxymagnesium, ethylbutoxymagnesium and octylbutoxymagnesium; and other organomagnesium compounds such as butylmagnesium hydride.

Concrete examples of the magnesium compound having no reduction ability include:

magnesium halides such as magnesium chloride, magnesium bromide, magnesium iodide and magnesium fluoride;

alkoxymagnesium halides such as methoxymagnesium chloride, ethoxymagnesium chloride, isopropoxymagnesium chloride, butoxymagnesium chloride and octoxymagnesium chloride;

aryloxymagnesium halides such as phenoxymagnesium chloride and methylphenoxymagnesium chloride;

alkoxymagnesiums such as ethoxymagnesium, isopropoxymagnesium, butoxymagnesium, n-octoxymagnesium and 2-ethylhexoxymagnesium;

aryloxymagnesiums such as phenoxymagnesium and dimethylphenoxymagnesium; and magnesium carboxylates such as magnesium laurate and magnesium stearate. Also employable as the magnesium compound having no reduction ability are metallic magnesium and hydrogenated magnesium.

These magnesium compounds having no reduction ability may be compounds derived from the aforementioned magnesium compounds having reduction ability or compounds derived during the preparation stage of a catalyst component.

For deriving the magnesium compounds having no reduction ability from the magnesium compounds having reduction ability, for example, the magnesium compounds having reduction ability are brought into contact with polysiloxane compounds, halogen-containing silane compounds, halogen-containing aluminum compounds, esters, alcohols, halogen-containing compounds, or compounds having an OH group or an active carbon-to-oxygen bond.

The magnesium compounds having reduction ability and the magnesium compounds having no reduction ability as described above may be used as a mixture with another metallic compound. These magnesium compounds may be used singly or in combination. Further, they may be used in a liquid state or in a solid state.

Of the above-exemplified magnesium compounds, magnesium halide, particularly magnesium chloride, is preferred. The magnesium compounds having no reduction ability may be those derived from other materials.

The electron donor (c-2) used in the present invention includes:

oxygen-containing electron donors such as alcohols, phenols, ketones, aldehydes, carboxylic acids, organic acid halides, esters of organic or inorganic acids, ethers, diethers, acid amides, acid anhydrides and alkoxysilanes; and nitrogen-containing electron donors such as ammonias, amines, nitriles, pyridines and isocyanates.

Concrete examples of the electron donor include:

alcohols having 1 to 18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms such as trichloromethanol, trichloroethanol and trichlorohexanol;

phenols having 6 to 20 carbon atoms which may contain a lower alkyl group such as phenol, cresol, xylenol, ethylphenol, propylphenol, nonylphenol, cumylphenol and naphthol;

ketones having 3 to 15 carbon atoms such as acetone, methyl ethyl ketone, methyl isobutyl ketone, acetophenone, benzophenone and benzoquinone;

aldehydes having 2 to 15 carbon atoms such as acetaldehyde, propionaldehyde, octylaldehyde, benzaldehyde, tolualdehyde and naphthaldehyde;

organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumalin phthallde and ethyl carbonate;

acid halides having 2 to 15 carbon atoms such as acetyl chloride, benzoyl chloride, toluoyl chloride and anisoyl chloride;

ethers having 2 to 20 carbon atoms such as methyl ether, ethyl ether, isopropyl ether, butyl ether, amyl ether, tetrahydrofuran, anisole and diphenyl ether;

acid amides such as N,N-dimethylacetamide, N,N-diethylbenzamide and N,N-dimethyltoluamide;

amines such as trimethylamine, triethylamine, tributylamine, tribenzylamine and tetramethylethylenediamine;

nitriles such as acetonitrile, benzonitrile and trinitrile;

pyridines such as pyridine, methylpyridine, ethylpyridine and dimethylpyridine; and acid anhydrides such as acetic anhydride, phthalic anhydride and benzoic anhydride.

Preferred examples of the organic acid esters are polycarboxylates having a skeleton represented by the following formula:

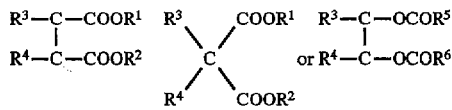

wherein $R^1$ is a substituted or unsubstituted hydrocarbon group; $R^2$, $R^5$ and $R^6$ are each hydrogen atom or a substituted or unsubstituted hydrocarbon group; $R^3$ and $R^4$ are each hydrogen atom or a substituted or unsubstituted hydrocarbon group, preferably at least one of them being a substituted or unsubstituted hydrocarbon group; $R^3$ and $R^4$ may be bonded to each other to form a cyclic structure; and when the hydrocarbon group of $R^1$ through $R^6$ is substituted, the substituent group contains a heteroatom such as N, O and S, and has a group such as C—O—C, COOR, COOH, OH, $SO_3H$, —C—N—C— and $NH_2$.

Examples of such polycarboxylates include aliphatic polycarboxylates, alicyclic polycarboxylates, aromatic polycarboxylates and heterocyclic polycarboxylates.

Concrete examples of the polycarboxylates preferably used include n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4-furandicarboxylate.

Phthalates are particularly preferred as the polycarboxylate.

Also employable as the electron donor (c-2) is a compound having at least two ether linkages existing through a plurality of atoms, which is represented by the following formula:

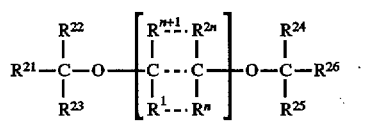

wherein n is an integer satisfying the relationship of $2 \leq n \leq 10$; $R^1$ to $R^{26}$ are substituent groups each having at least one element selected from carbon, hydrogen, oxygen, halogen, nitrogen, sulfur, phosphorus, boron and silicon atom; any optional combination of from $R^1$ to $R^{26}$, preferably $R^1$ to $R^{2n}$, may form in cooperation a ring other than a benzene ring; and an atom other than carbon may be contained in the main chain.

Preferred examples of such compound include 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

The above-exemplified electron donors (c-2) may be used in combination of two or more kinds.

The component (C2) used for the second catalyst for olefin polymerization according to the present invention is a material obtained by contacting the magnesium compound (c-1) with the electron donor (c-2). Such component (C2) preferably is a complex formed from the magnesium compound (c-1) and the electron donor (c-2). Of various complexes, preferred is that formed from the magnesium compound (c-1) and alcohol, carboxylic acid or amine. Concrete examples of such complex include a magnesium chloride 2-ethylhexyl alcohol complex and a magnesium chloride ethanol complex.

The second catalyst for olefin polymerization according to the present invention is formed by contacting the transition metal compound (A) (catalyst component), the organoaluminum compound (B) (catalyst component) and the component (C2) with each other. The contact of the component (A), the component (B) and the component (C2) can be carried out in or outside the polymerization system.

For contacting these components (A), (B) and (C2), it is preferred that the component (A) and the component (B) are first contacted with each other and then they are contacted with the component (C2), or that the component (B) and the component (C2) are first contacted with each other and then they are contacted with the component (A).

The contact of these components (A), (B) and (C2) may be carried out in the presence or absence of a solvent. Useful as the solvent are aliphatic hydrocarbons, alicyclic hydrocarbons, aromatic hydrocarbons and halogenated hydrocarbons, which are generally used as polymerization solvents.

The temperature for contacting the components (A), (B) and (C2) is in the range of generally −80° to 200° C., preferably 10° to 150° C., and the period of time therefor is in the range of generally 0.1 second to 10 hours, preferably 1 second to 1 hour.

Next, the third catalyst for olefin polymerization according to the present invention will be described below.

The third catalyst for olefin polymerization according to the present invention comprises:

(A) a compound of a transition metal in Group IVB of the periodic table, which contains a ligand having a cyclopentadienyl skeleton;
(B) an organoaluminum compound; and
(C3) a material obtained by contacting with each other
   (c-1) a magnesium compound,
   (c-2) an electron donor, and
   (c-3) an organometallic compound.

As the compound (A) of a transition metal in Group IVB of the periodic table, which contains a ligand having a cyclopentadienyl skeleton, there can be exemplified those used for the aforesaid first catalyst for olefin polymerization.

Also as the organoaluminum compound (B) employable in present invention, there can be exemplified those used for the aforesaid first catalyst for olefin polymerization.

The catalyst component (C3) employable in the present invention is a material obtained by contacting a magnesium compound (c-1), an electron donor (c-2) and an organometallic compound (c-3) with each other.

The magnesium compound (c-1) includes the magnesium compounds having or not having reduction ability used for the aforesaid second catalyst for olefin polymerization. These magnesium compounds may be used as an organometallic compound (C-3) described later. Further, the magnesium compound may be used as a complex or double compound with another metal such as aluminum, zinc, boron, beryllium, sodium and potassium, or as a mixture with a compound of a metal such as aluminum, zinc, boron, beryllium, sodium and potassium. The magnesium compounds may be used singly or in combination. Further, they may be used in a liquid state or in a solid state.

Of the magnesium compounds, magnesium halide, particularly magnesium chloride, is preferred. The magnesium compounds having no reduction ability may be those derived from other materials.

Useful as the electron donor (c-2) are electron donors used for the aforesaid second catalyst for olefin polymerization.

Useful as the organometallic compound (c-3) are compounds exemplified before as the organoaluminum compound (B) with respect to the first catalyst for olefin polymerization and organometallic compounds containing a metal in Group II of the periodic table.

Examples of the organometallic compounds containing a metal in Group II of the periodic table include a compound represented by the following formula:

wherein $R^k$ is a hydrocarbon group of 1 to 15 carbon atoms or halogen atom, $R^1$ is a hydrocarbon group of 1 to 15 carbon atoms, and $M^2$ is a metal such as Mg, Zn and Cd.

Concrete examples of such compounds include diethylzinc, diethylmagnesium, butylethylmagnesium, ethylmagnesium chloride and butylmagnesium chloride.

The component (C3) for use in the third catalyst for olefin polymerization according to the present invention is a material obtained by contacting the magnesium compound (c-1), the electron donor (c-2) and the organometallic compound (c-3) with each other. Concretely, there can be mentioned, as the component (C3), a material obtained by bringing a complex formed from the magnesium compound (c-1) and the electron donor (c-2) into contact with the organometallic compound (c-3), and a material obtained by bringing the magnesium compound (c-1), the electron donor (c-2) and the organometallic compound (c-3) into contact with each other.

The contact of the complex formed from the magnesium compound (c-1) and the electron donor (c-2) with the organometallic compound (c-3), or the contact of the magnesium compound (c-1), the electron donor (c-2) and the organometallic compound (c-3) with each other can be carried out in an organic solvent. Useful as the organic solvent are aliphatic hydrocarbons, alicyclic hydrocarbons, aromatic hydrocarbons and the halogenated hydrocarbons, which are generally used for polymerization.

In the contact of the complex formed from the magnesium compound (c-1) and the electron donor (c-2) with the organometallic compound (c-3), the organometallic compound (c-3) is used preferably in an amount of 0.1 to 1,000 times by mol the amount of the complex. In this case, the temperature for the contact is in the range of generally −70° to 200° C., preferably 10° to 150° C., and the period of time therefor is in the range of generally 0.1 second to 10 hours, preferably 1 second to 1 hour.

The third catalyst for olefin polymerization according to the present invention is formed by contacting the transition metal compound (A) (catalyst component), the organoaluminum compound (B) (catalyst component) and the component (C3) with each other. The contact of these components (A), (B) and (C3) may be carried out in or outside the polymerization system.

The contact of these components (A), (B) and (C3) may be carried out in an optional order, but it is preferred that the component (A) and the component (B) are first contacted with each other and then they are contacted with the component (C3), or that the component (B) and the component (C3) are first contacted with each other and then they are contacted with the component (A). Of these, particularly preferred is that the component (A) and the component (B) are first contacted with each other and then they are contacted with the component (C3).

The contact of these components (A), (B) and (C3) may be carried out in the presence or absence of a solvent. Useful as the solvent are aliphatic hydrocarbons, alicyclic hydrocarbons, aromatic hydrocarbons and halogenated hydrocarbons, which are generally used as polymerization solvents.

The temperature for contacting the components (A), (B) and (C3) is in the range of generally −80° to 200° C., preferably 10° to 150° C., and the period of time therefor is in the range of generally 0.1 second to 10 hours, preferably 1 second to 1 hour.

The catalysts for olefin polymerization according to the present invention described hereinbefore may contain other components which are useful for olefin polymerization in addition to the above-described components.

Use of the catalysts for olefin polymerization according to the present invention makes it possible to polymerize an olefin with a high polymerization activity.

In the process for olefin polymerization according to the present invention, an olefin is polymerized in the presence of the above-described catalysts for olefin polymerization.

Examples of olefins employable in the polymerization includes α-olefins having 2 to 20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

Also employable are cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene, vinylcyclohexane, dienes, etc.

With respect to the first catalyst for olefin polymerization, the component (A) is used in the polymerization in an amount of usually 0.00001 to 10.0 mmol, preferably 0.0001 to 0.1 mmol, in terms of the transition metal atom contained in the transition metal compound (A), per 1 liter of the polymerization volume.

The organoaluminum compound (B) is used in an amount of usually 0.008 to 800 mmol, preferably 0.008 to 8 mmol, in terms of the aluminum atom contained in the organoaluminium compound (B), per 1 liter of the polymerization volume.

In the case of using an ion-exchange material as the Brønsted acid (C1), the ion-exchange material is used in an amount of usually 0.0001 to 1,000 mmol equivalent, preferably 0.001 to 10 mmol equivalent, in terms of ion-exchange equivalent.

In the polymerization, the organoaluminum compound (B) is used in such an amount that the gram atom ratio (Al/transition metal) of the aluminum atom contained in the compound (B) to the transition metal contained in the transition metal compound (A) is in the range of usually 0.5 to 10,000, preferably 2 to 1,000. When the Brønsted acid (C1) is an ion-exchange material, the ion exchange material is used in such an amount that the ratio (eq/transition metal) of the ion exchange equivalent of the compound (C1) to the transition metal gram atom contained in the transition metal compound (A) is in the range of usually 0.5 to 1,000, preferably 1 to 100.

With respect to the second and third catalysts for olefin polymerization, the component (A) is used in the polymerization in an amount of usually 0.0001 to 10.0 mmol, preferably 0.001 to 5.0 mmol, in terms of the transition metal atom contained in the component (A), per 1 liter of the polymerization volume.

The component (B) is used in an amount of usually 0.008 to 800 mmol, preferably 0.08 to 80 mmol, in terms of the aluminum atom contained in the component (B), per 1 liter of the polymerization volume.

The component (C2) or the component (C3) is used in an amount of usually 0.0001 to 1,000 mmol, preferably 0.001 to 100 mmol, in terms of the magnesium atom contained in the component (C2) or the component (C3), per 1 liter of the polymerization volume.

In the polymerization, the component (B) is used in such an amount that the gram atom ratio (Al/M) of the aluminum atom (Al) contained in the component (B) to the transition metal (M) contained in the component (A) is in the range of usually 1 to 10,000, preferably 1 to 1,000.

The component (C2) or the component (C3) is used in such an amount that the gram atom ratio (Mg/M) of the magnesium atom (Mg) contained in the component (C2) or the component (C3) to the transition metal (M) contained in the component (A) is in the range of usually 0.5 to 1,000, preferably 1 to 100.

In the present invention, the polymerization may be conducted by a process for liquid phase polymerization such as suspension polymerization or by a process for gas phase polymerization.

When the polymerization is conducted by a process for liquid phase polymerization, hydrocarbons may be used as a polymerization solvent. Examples of the hydrocarbons include:

aliphatic hydrocarbons such as propane, butane, pentane, hexane, heptane, octane, decane, dodecane and kerosine;

alicyclic hydrocarbon such as cyclopentane, cyclohexane and methylcyclopentane;

aromatic hydrocarbons such as benzene, toluene and xylene; and halogenated hydrocarbons such as ethylene chloride, chlorobenzene and dichloromethane. These hydrocarbons may be used singly or in combination. Further, the olefin itself may be used as a solvent.

The temperature for the olefin polymerization is in the range of usually −50° to 150° C., preferably 0° to 100° C. The polymerization pressure is in the range of usually atmospheric pressure to 100 kg/cm$^2$, preferably atmospheric pressure to 50 kg/cm$^2$.

The polymerization may be carried out either batchwise, semi-continuously or continuously. Further, the polymerization may be carried out in two or more steps having reaction conditions different from each other.

The molecular weight of the olefin polymer to be obtained can be regulated by allowing hydrogen to exist in the polymerization system or by changing the polymerization temperature.

With respect to the catalysts for olefin polymerization according to the present invention, the aforementioned catalyst components may be prepolymerized with an olefin.

EFFECT OF THE INVENTION

By the use of the catalyst for olefin polymerization according to the present invention, an olefin can be polymerized with a high polymerization activity even if any organoaluminum oxy-compound is not used. Further, the catalyst for olefin polymerization according to the present invention is available at a low cost because an expensive organoaluminum oxy-compound is not used.

In the process for olefin polymerization according to the present invention, an olefin polymer can be prepared at a high yield and economically because an olefin is polymerized in the presence of the above-mentioned catalyst.

EXAMPLE

The present invention will be described below in more detail with reference to examples, but it should be construed that the present invention is in no way limited to those examples.

EXAMPLE 1

A glass polymerizer thoroughly purged with nitrogen was charged with 1,000 ml of purified toluene. The polymerizer was warmed to 75° C., and ethylene was introduced into the polymerizer to sufficiently saturate toluene with ethylene. Thereafter, to the polymerizer were successively added 0.75 mmol (in terms of aluminum atom) of triisobutylaluminum as a toluene solution, 0.005 mmol (in terms of zirconium atom) of ethylenebis(indenyl)zirconium dichloride as a toluene solution and 62.5 mg [0.05 mmol equivalent in terms of $-SO_2OH$ group] of an ultra-strongly acidic ion-exchange resin (trade name: Nafion-H), to initiate polymerization. After 20 minutes, a small amount of isobutyl alcohol was added to terminate the polymerization. Then, a polymer was precipitated in the whole amount by the use of a large amount of methanol, followed by adding a small amount of hydrochloric acid. The resultant mixture was filtered over a glass filter to collect the polymer and the polymer was washed with methanol.

The polymer was dried at 80° C. for 10 hours under a reduced pressure, to obtain 12.95 g of polyethylene.

The polyethylene thus obtained had an intrinsic viscosity [η], as measured in decalin at 135° C., of 1.84 dl/g.

Comparative Example 1

The procedure of Example 1 was repeated except for not using the ultra-strongly acidic ion-exchange resin (Nafion-H), to perform polymerization. As a result, 5.85 g of polyethylene was obtained.

The polyethylene thus obtained had an intrinsic viscosity [η] of 1.71 dl/g.

EXAMPLE 2

The procedure of Example 1 was repeated except for using 11.3 mg [0.05 mmol equivalent in terms of $-SO_2OH$ group] of a cation-exchange resin (trade name: Amberlist 15E) in place of the ultra-strongly acidic ion-exchange resin (Nafion-H) and using 0.4 mmol (in terms of aluminum atom) of the toluene solution of triisobutylaluminum, to perform polymerization. As a result, 11.9 g of polyethylene was obtained.

EXAMPLE 3

A glass polymerizer thoroughly purged with nitrogen was charged with 1,000 ml of purified toluene. The polymerizer was warmed to 75° C., and ethylene was introduced into the polymerizer to sufficiently saturate toluene with ethylene.

Separately, to a 20 ml Schrenk bottle were added 22.5 mg [0.1 mmol equivalent in terms of $-SO_2OH$ group] of a cation-exchange resin (trade name: Amberlist 15E) and 5.0 ml of toluene, and then further added 0.2 mmol (in terms of aluminum atom) of a toluene solution of triisobutylaluminum. The resultant mixture was stirred at room temperature for 10 minutes.

Then, to the above polymerizer were successively added 0.2 mmol (in terms of aluminum atom) of triisobutylaluminum and 0.005 mmol (in terms of zirconium atom) of ethylenebis(indenyl)zirconium dichloride, and was further added all the reaction solution obtained in the Schrenk bottle to initiate polymerization. After 20 minutes, a small amount of isobutyl alcohol was added to terminate the polymerization. Then, a post treatment was carried out in the same manner as described in Example 1, to obtain 16.0 g of polyethylene.

EXAMPLE 4

The procedure of Example 3 was repeated except for using 27.3 mg [0.12 mmol equivalent in terms of $-SO_2OH$ group] of the cation-exchange resin (trade name: Amberlist 15E) having been ground in a mortar, to perform polymerization. As a result, 22.05 g of polyethylene was obtained.

EXAMPLE

The procedure of Example 3 was repeated except for using tridecylaluminum in place of the triisobutylaluminum and varying the polymerization period to 45 minutes, to perform polymerization. As a result, 16.48 g of polyethylene was obtained.

Comparative Example 2

The procedure of Example 4 was repeated except for not using the cation-exchange resin, to perform polymerization. As a result, 6.30 g of polyethylene was obtained.

EXAMPLE 6

The procedure of Example 1 was repeated except for varying the amount of the ethylenebis(indenyl)zirconium dichloride to 0.002 mmol and using 0.02 mmol (in terms of phosphorus atom) of cesium 12-molybdophosphate in place of the ultra-strongly acidic cation-exchange resin (Nafion-H), to perform polymerization. As a result, 5.88 g of polyethylene was obtained.

EXAMPLE 7

The procedure of Example 1 was repeated except for using 0.05 mmol of methanesulfonic acid in place of the ultra-strongly acidic cation-exchange resin (Nafion-H), to perform polymerization. As a result, 12.2 g of polyethylene was obtained.

EXAMPLE 8

[Preparation of a component (c-i)]

95.2 g of magnesium chloride anhydride, 442 ml of decane and 390.6 g of 2-ethylhexyl alcohol were reacted with each other at 130° C. for 2 hours to give a homogeneous solution (component (c-i)).

[Polymerization]

A glass polymerizer purged with nitrogen was charged with 1,000 ml of toluene, then the polymerizer was warmed to 75° C., and ethylene was introduced into the polymerizer. Then, to the polymerizer were added triisobutylaluminum (0.4 mmol in terms of aluminum atom) and the component (c-i) (0.05 mmol in terms of magnesium atom). After 2 minutes, to the polymerizer was further added ethylenebis(indenyl)zirconium dichloride (0.005 mmol in terms of zirconium atom) to initiate polymerization. After the polymerization was performed for 30 minutes, a small amount of isobutyl alcohol was added to terminate the polymerization. The reaction product was introduced into a large amount of methanol to precipitate a polymer in the whole amount. To the precipitated polymer was added a hydrochloric acid, and the resultant mixture was filtered over a glass filter to collect the polymer. The polymer was dried for 10 hours under vacuum, to obtain 9.75 g of polyethylene. The polyethylene thus obtained had an intrinsic viscosity [η] of 1.66 dl/g.

EXAMPLE 9

The procedure of Example 8 was repeated except for varying the addition order of the catalyst components to the polymerizer so that the triisobutylaluminum and the ethylenebis(indenyl)zirconium dichloride were first added and after 2 minutes the component (c-i) was further added, to perform polymerization. As a result, 1.48 g of polyethylene was obtained. The polyethylene thus obtained had an intrinsic viscosity [η] of 1.69 dl/g.

Comparative Example 3

The procedure of Example 8 was repeated except for varying the addition order of the catalyst components to the polymerizer so that the component (c-i) and the ethylenebis(indenyl)zirconium dichloride were first added and after 2 minutes the triisobutylaluminum was further added, to perform polymerization. As a result, 0.93 g of polyethylene was obtained.

EXAMPLE 10

[Preparation of a solution of a component (c-ii)]

To a toluene solution of magnesium chloride 3-ethylhexyl alcohol complex (26.4 mmol) was dropwise added a toluene solution of triisobutylaluminum (92.4 mmol) while stirring, to prepare a solution of a component (c-ii).

[Polymerization]

A glass polymerizer purged with nitrogen was charged with 1,000 ml of toluene, then the polymerizer was warmed to 75° C., and ethylene was introduced into the polymerizer. Then, to the polymerizer were added triisobutylaluminum (0.4 mmol in terms of aluminum atom) and the solution of a component (c-ii) (0.5 mmol in terms of magnesium atom). After 2 minutes, to the polymerizer was further added ethylenebis(indenyl)zirconium dichloride (0.005 mmol in terms of zirconium atom) to initiate polymerization. After the polymerization was performed for 60 minutes, a small amount of isobutyl alcohol was added to terminate the polymerization. The reaction product was introduced into a large amount of methanol to precipitate a polymer in the whole amount. To the precipitated polymer was added a hydrochloric acid, and the resultant mixture was filtered over a glass filter to collect the polymer. The polymer was dried for 10 hours under vacuum, to obtain 11.30 g of polyethylene. The polyethylene thus obtained had an intrinsic viscosity [η] of 1.91 dl/g.

EXAMPLE 11

The procedure of Example 10 was repeated except for using the solution of a component (c-ii) in an amount of 0.05 mmol in terms of magnesium atom, to perform polymerization. As a result, 42.30 g of polyethylene was obtained. The polyethylene thus obtained had an intrinsic viscosity [η] of 2.34 dl/g.

EXAMPLE 12

The procedure of Example 10 was repeated except for using the solution of a component (c-ii) in an amount of 0.015 mmol in terms of magnesium atom, to perform polymerization. As a result, 48.25 g of polyethylene was obtained. The polyethylene thus obtained had an intrinsic viscosity [η] of 2.40 dl/g.

EXAMPLE 13

The procedure of Example 10 was repeated except for using tridecylaluminum in place of the triisobutylaluminum, to perform polymerization. As a result, 43.20 g of polyethylene was obtained. The polyethylene thus obtained had an intrinsic viscosity [η] of 2.46 dl/g.

EXAMPLE 14

[Preparation of a suspension of an Al-free component (c-iii)]

A glass reactor was equipped with a cooling tube, a dropping funnel and a stirring bar, and the reactor placed on an oil bath was purged with nitrogen. The reactor were charged with toluene and $MGCl_2.2.61\ C_2H_5OH$ (25 mmol) in a nitrogen atmosphere, and to the reactor was then dropwise added slowly triisobutylaluminum (75 mmol) while stirring the content of the reactor. Thereafter, the temperature of the oil bath was elevated to 80° C. to perform reaction for 1 hour. After completion of the reaction, a solid was filtered over a glass filter in a nitrogen atmosphere and washed with toluene. The solid was suspended again in toluene, to prepare a suspension of an Al-free component (c-iii).

[Polymerization]

The polymerization procedure in Example 10 was repeated except for using the suspension of an Al-free component (c-iii) (0.05 mmol in terms of magnesium atom) in place of the solution of a component (c-ii), to perform polymerization. As a result, 10.2 g of polyethylene was obtained.

EXAMPLE 15

The procedure of Example 14 was repeated except for varying the addition order of the catalyst components to the polymerizer so that the triisobutylaluminum and the ethylenebis(indenyl)zirconium dichloride were first added and after 2 minutes the suspension of an Al-free component (c-iii) was further added, to perform polymerization. As a result, 5.63 g of polyethylene was obtained.

EXAMPLE 16

The procedure of Example 14 was repeated except for using the suspension of an Al-free component (c-iii) in an amount of 0.4 mmol in terms of magnesium atom, to perform polymerization. As a result, 4.75 g of polyethylene was obtained.

EXAMPLE 17

The procedure of Example 14 was repeated except for using the suspension of an Al-free component (c-iii) in an amount of 0.015 mmol in terms of magnesium atom, to perform polymerization. As a result, 11.0 g of polyethylene was obtained.

What is claimed is:

1. A process for olefin polymerization comprising polymerizing an olefin in the presence of a catalyst for olefin polymerization comprising:

(A) a compound of a transition metal in Group IVB of the Periodic Table, which is represented by the following formula (I'):

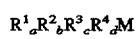

wherein M is zirconium; $R^1$ is a ligand having a cyclopentadienyl skeleton; $R^2$, $R^3$ and $R^4$ are each a ligand having a cyclopentadienyl skeleton, an alkyl group, a cycloalkyl group, an aryl group, an aralkyl group, an alkoxy group, an aryloxy group, a trialkylsilyl group, $SO_3R$ (wherein R is a hydrocarbon group of 1 to 8 carbon atoms or a substituted hydrocarbon group of 1 to 8 carbon atoms), a halogen atom or hydrogen atom, a is an integer of not less than 1; and a+b+c+d=4, and wherein at least one of $R^2$, $R^3$ and $R^4$ is the ligand having the cyclopentadienyl skeleton;

(B) an organoaluminum compound; and (C) a Brønsted acid which is a polystyrene strongly acidic cation-exchange resin having $SO_2OH$ groups.

2. The process of claim 1 wherein olefin is polymerized in the presence of a catalyst comprising the transition metal compound (A) in an amount of from about 0.00001 to 10 mmol per liter of polymerization volume, the organoaluminum compound (B) in an amount of from about 0.008 to 800 mmol per liter of polymerization volume, and the Brønsted acid (C) in an amount of about 0.0001 to 1,000 mmol in terms of ion exchange equivalent.

3. The process of claim 1 wherein olefin is polymerized in the presence of a catalyst wherein the ratio of the amount of polystyrene cation-exchange resin (C) to the amount of the transition metal compound (A) is in the range of from about 0.5 to 1,000, in terms of ion exchange equivalent of the compound (C) to the metal gram atom of the transition metal.

* * * * *